(12) United States Patent
Iazikov et al.

(10) Patent No.: US 7,519,248 B2
(45) Date of Patent: Apr. 14, 2009

(54) TRANSMISSION GRATINGS DESIGNED BY COMPUTED INTERFERENCE BETWEEN SIMULATED OPTICAL SIGNALS AND FABRICATED BY REDUCTION LITHOGRAPHY

(75) Inventors: Dmitri Iazikov, Springfield, OR (US); Thomas W. Mossberg, Eugene, OR (US); Christoph M. Greiner, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 0 days.

(21) Appl. No.: 11/531,274

(22) Filed: Sep. 12, 2006

(65) Prior Publication Data

US 2007/0053635 A1 Mar. 8, 2007

Related U.S. Application Data

(60) Provisional application No. 60/716,461, filed on Sep. 12, 2005.

(51) Int. Cl.
*G02B 6/34* (2006.01)
*G03H 1/00* (2006.01)
*G03H 1/04* (2006.01)

(52) U.S. Cl. ............... 385/37; 359/1; 359/29; 359/366; 359/900

(58) Field of Classification Search ............ None
See application file for complete search history.

(56) References Cited

U.S. PATENT DOCUMENTS

| | | | |
|---|---|---|---|
| 3,995,937 A | 12/1976 | Baues et al. | |
| 4,006,967 A | 2/1977 | Kenan et al. | |
| 4,140,362 A | 2/1979 | Tien | |
| 4,387,955 A | 6/1983 | Ludman et al. | |
| 4,440,468 A | 4/1984 | Auracher et al. | |
| 4,660,934 A | 4/1987 | Akiba et al. | |

(Continued)

FOREIGN PATENT DOCUMENTS

EP     0 310 438 A1     4/1989

(Continued)

OTHER PUBLICATIONS

Hirayama et al, Applied Physics Letters, vol. 69 No. 6 p. 791 (Aug. 5, 1996).

(Continued)

*Primary Examiner*—Omar Rojas
(74) *Attorney, Agent, or Firm*—David S. Alavi

(57) ABSTRACT

A method comprises computing an interference pattern between a simulated design input optical signal and a simulated design output optical signal, and computationally deriving an arrangement of at least one diffractive element set from the computed interference pattern. The interference pattern is computed in a transmission grating region, with the input and output optical signals each propagating through the transmission grating region as substantially unconfined optical beams. The arrangement of diffractive element set is computationally derived so that when the diffractive element set thus arranged is formed in or on a transmission grating, each diffractive element set would route, between corresponding input and output optical ports, a corresponding diffracted portion of an input optical signal incident on and transmitted by the transmission grating. The method can further comprise forming the set of diffractive elements in or on the transmission grating according to the derived arrangement.

68 Claims, 6 Drawing Sheets

U.S. PATENT DOCUMENTS

| | | | |
|---|---|---|---|
| 4,740,951 A | 4/1988 | Lizet et al. |
| 4,743,083 A | 5/1988 | Schimpe |
| 4,746,186 A | 5/1988 | Nicia |
| 4,773,063 A | 9/1988 | Hunsperger et al. |
| 4,786,133 A | 11/1988 | Gidon et al. |
| 4,803,696 A | 2/1989 | Pepper et al. |
| 4,824,193 A | 4/1989 | Maeda et al. |
| 4,834,474 A | 5/1989 | George et al. |
| 4,846,552 A | 7/1989 | Veldkamp et al. |
| 4,852,960 A | 8/1989 | Alferness et al. |
| 4,923,271 A | 5/1990 | Henry et al. |
| 4,938,553 A | 7/1990 | Maerz et al. |
| 5,040,864 A | 8/1991 | Hong |
| 5,093,874 A | 3/1992 | Hawkins et al. |
| 5,107,359 A | 4/1992 | Ohuchida |
| 5,165,104 A | 11/1992 | Weverka |
| 5,195,161 A | 3/1993 | Adar et al. |
| 5,206,922 A | 4/1993 | Westland et al. |
| 5,239,598 A | 8/1993 | Wight et al. |
| 5,357,591 A | 10/1994 | Jiang et al. |
| 5,450,511 A | 9/1995 | Dragone |
| 5,453,871 A | 9/1995 | Kolner et al. |
| 5,668,900 A | 9/1997 | Little et al. |
| 5,768,450 A | 6/1998 | Bhagavatula |
| 5,812,318 A | 9/1998 | Babbitt et al. |
| 5,830,622 A | 11/1998 | Canning et al. |
| 5,907,647 A | 5/1999 | Eggleton et al. |
| 5,995,691 A | 11/1999 | Arai et al. |
| 6,011,884 A | 1/2000 | Dueck et al. |
| 6,011,885 A | 1/2000 | Dempewolf et al. |
| 6,137,933 A | 10/2000 | Hunter et al. |
| 6,144,480 A | 11/2000 | Li et al. |
| 6,169,613 B1 | 1/2001 | Amitai et al. |
| 6,169,614 B1 | 1/2001 | Whitcomb et al. |
| 6,243,514 B1 | 6/2001 | Thompson |
| 6,266,463 B1 | 7/2001 | Laming et al. |
| 6,285,813 B1 | 9/2001 | Schultz et al. |
| 6,323,970 B1 | 11/2001 | Popovich |
| 6,408,118 B1 | 6/2002 | Ahuja et al. |
| 6,473,232 B2 | 10/2002 | Ogawa |
| 6,553,162 B1 | 4/2003 | Okayama |
| 6,603,901 B1 | 8/2003 | Hale et al. |
| 6,678,429 B2 | 1/2004 | Mossberg et al. |
| 6,702,897 B2 | 3/2004 | Cullen et al. |
| 6,718,093 B2 | 4/2004 | Zhou |
| 6,768,834 B1 | 7/2004 | Gruhlke |
| 6,813,048 B2 | 11/2004 | Kitamura |
| 6,823,115 B2 | 11/2004 | Greiner et al. |
| 6,829,417 B2 | 12/2004 | Greiner et al. |
| 6,836,492 B2 | 12/2004 | Ido et al. |
| 6,850,670 B2 | 2/2005 | Parhami et al. |
| 6,859,318 B1 | 2/2005 | Mossberg |
| 6,876,791 B2 | 4/2005 | Murashima et al. |
| 6,879,441 B1 | 4/2005 | Mossberg |
| 6,928,223 B2 | 8/2005 | Walpole et al. |
| 6,961,491 B2 | 11/2005 | Greiner et al. |
| 6,965,464 B2 | 11/2005 | Mossberg |
| 6,965,716 B2 | 11/2005 | Greiner et al. |
| 6,985,656 B2 | 1/2006 | Iazikov et al. |
| 6,987,911 B2 | 1/2006 | Mossberg et al. |
| 6,990,276 B2 | 1/2006 | Brice et al. |
| 6,993,223 B2 | 1/2006 | Greiner et al. |
| 7,003,187 B2 | 2/2006 | Frick et al. |
| 7,009,743 B2 | 3/2006 | Mossberg |
| 7,016,569 B2 | 3/2006 | Mule et al. |
| 7,049,704 B2 | 5/2006 | Chakravorty et al. |
| 7,054,044 B2 | 5/2006 | Hamano et al. |
| 7,054,517 B2 | 5/2006 | Mossberg et al. |
| 7,062,128 B2 | 6/2006 | Mossberg |
| 7,116,453 B2 | 10/2006 | Mossberg |
| 7,116,852 B2 | 10/2006 | Tuda |
| 7,120,334 B1 | 10/2006 | Greiner et al. |
| 7,123,794 B2 | 10/2006 | Greiner et al. |
| 7,181,103 B1 | 2/2007 | Greiner et al. |
| 7,190,856 B1 | 3/2007 | Iazikov et al. |
| 7,190,858 B1 | 3/2007 | Greiner et al. |
| 7,190,859 B2 | 3/2007 | Griener et al. |
| 7,194,164 B2 | 3/2007 | Iazikov et al. |
| 7,203,401 B2 | 4/2007 | Mossberg et al. |
| 7,224,855 B2 | 5/2007 | Iazikov et al. |
| 7,224,867 B2 | 5/2007 | Mossberg |
| 7,260,290 B1 | 8/2007 | Greiner et al. |
| 7,286,732 B2 | 10/2007 | Greiner et al. |
| 7,292,755 B1 | 11/2007 | Greiner et al. |
| 7,327,908 B1 | 2/2008 | Iazikov et al. |
| 7,330,614 B1 | 2/2008 | Mossberg et al. |
| 7,333,692 B1 | 2/2008 | Mossberg et al. |
| 7,349,599 B1 | 3/2008 | Iazikov et al. |
| 2002/0071646 A1 | 6/2002 | Eggleton et al. |
| 2002/0113958 A1 | 8/2002 | Wilsher et al. |
| 2003/0011833 A1 | 1/2003 | Yankov et al. |
| 2003/0039444 A1 | 2/2003 | Mossberg et al. |
| 2003/0068113 A1 | 4/2003 | Janz et al. |
| 2003/0117677 A1 | 6/2003 | Mossberg |
| 2004/0076374 A1 | 4/2004 | Greiner et al. |
| 2004/0131360 A1 | 7/2004 | Iazikov et al. |
| 2004/0170356 A1 | 9/2004 | Iazikov et al. |
| 2004/0179779 A1 | 9/2004 | Greiner et al. |
| 2004/0208466 A1 | 10/2004 | Mossberg et al. |
| 2004/0258356 A1 | 12/2004 | Brice et al. |
| 2005/0018951 A1 | 1/2005 | Mossberg et al. |
| 2005/0063430 A1 | 3/2005 | Doucet et al. |
| 2005/0078912 A1 | 4/2005 | Iazikov et al. |
| 2005/0135744 A1 | 6/2005 | Greiner et al. |
| 2005/0135745 A1 | 6/2005 | Greiner et al. |
| 2005/0135747 A1 | 6/2005 | Greiner et al. |
| 2005/0152011 A1 | 7/2005 | Mossberg |
| 2005/0163425 A1 | 7/2005 | Greiner et al. |
| 2005/0196114 A1 | 9/2005 | Xu et al. |
| 2006/0023280 A1 | 2/2006 | Mossberg |
| 2006/0139712 A1 | 6/2006 | Mossberg |
| 2006/0177178 A1 | 8/2006 | Greiner et al. |
| 2006/0193553 A1 | 8/2006 | Mossberg |
| 2006/0210214 A1 | 9/2006 | Uhlhorn et al. |
| 2006/0233493 A1 | 10/2006 | Mossberg |
| 2007/0019910 A1 | 1/2007 | Greiner et al. |
| 2007/0034730 A1 | 2/2007 | Mossberg et al. |
| 2007/0053635 A1 | 3/2007 | Iazikov et al. |
| 2007/0154144 A1 | 7/2007 | Greiner et al. |

FOREIGN PATENT DOCUMENTS

| | | |
|---|---|---|
| GB | 2 168 215 A | 6/1986 |
| WO | WO - 99/35523 A1 | 7/1999 |
| WO | WO - 99/56159 A1 | 11/1999 |
| WO | WO 02/075411 | 9/2002 |

OTHER PUBLICATIONS

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjansson et al, IEEE Photonics Technology Letters, vol. 12 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p. 1419 (Sep. 1987).

Eriksson et al, IEEE Photonics Technology Letters, vol. 9 No. 12 p. 1570 (Dec. 1997).

Capron et al, J. Lightwave Tech., vol. 11 No. 12 pp. 2009-2014 (Dec. 1993).

Deri et al, IEEE Photonics Tech. Lett., vol. 6 No. 2 pp. 242-244 (Feb. 1994).
Grunnet-Jepsen et al, Electon. Lett., vol. 35 No. 13 pp. 1096-1097 (Jun. 1999).
Paddon et al, Opt. Lett., vol. 23 No. 19 pp. 1529-1531 (1998).
Madsen et al, IEEE J. Sel. Top. Quant. Elec., vol. 4 No. 6 pp. 925-929 (Nov./Dec. 1998).
Gini et al, J. Lightwave Tech., vol. 16 No. 4 pp. 625-630 (Apr. 1998).
Day et al, J. Lightwave Tech., vol. 14 No. 8 pp. 1815-1824 (Aug. 1996).
McGreer, IEEE Photonics Tech. Lett., vol. 7 No. 3 pp. 324-326 (Mar. 1995).
Takenouchi et al, Optics Express, vol. 6 No. 6 pp. 124-135 (Mar. 2000).
Grunnett-Jepsen et al, Photonics Tech. Lett., vol. 11 No. 10 p. 1283 (Oct. 1999).
Babbitt et al, Opt. Commun., vol. 148 pp. 23-26 (1998).
Brigham et al, Analysis of scattering from large planar gratings of compliant ctlindrical shells, J. Acoust. Soc. Am., vol. 61 No. 1 pp. 48-59 (Jan. 1977).
Kurokawa et al, Electron. Lett., vol. 33 No. 22 pp. 1890-1891 (Oct. 1997).
Sudbo et al, J. Lightwave Tech., vol. 8 No. 6 pp. 998-1006 (Jun. 1990).
Henry, J. Lightwave Tech., vol. 8 No. 5 pp. 748-755 (May 1990).
Koontz et al, Appl. Phys. Lett., vol. 71 No. 10 pp. 1400-1402 (Sep. 1997).
Song et al, Appl. Opt., vol. 34 No. 26 pp. 5913-5919 (Sep. 1995).
Brazas et al, Appl. Opt., vol. 34 No. 19 pp. 3786-3792 (Jul. 1995).
Bates et al, Appl. Opt., vol. 32 No. 12 pp. 2112-2116 (Apr. 1993).
Wang et al, Appl. Opt., vol. 32 No. 14 pp. 2606-2613 (May 1993).
Magnusson et al, Appl. Phys. Lett., vol. 61 No. 9 pp. 1022-1024 (Aug. 1992).
Ojha et al, Demonstration of low loss integrated InGaAsP/InP demultiplexer device with low polarisation sensitivity, Electron. Lett., vol. 29 No. 9 p. 805 (Apr. 1993).
Li, Opt. Commum., vol. 114 pp. 406-412 (1995).
Soole et al, Electron. Lett., vol. 31 No. 15 pp. 1276-1277 (Jul. 1995).
Rantala et al, Electron. Lett. vol. 34 No. 5 pp. 455-456 (Mar. 1998).
Cowin et al Electron. Lett., vol. 35 No. 13 pp. 1074-1076 (Jun. 1999).
Canning et al, Opt. Commun., vol. 171 pp. 213-217 (1999).
Tien et al, Use of concentric-arc grating as a thin-film spectrograph for guided waves, Am. Inst. of Physics (1980) pp. 524-525.
Kaneko et al, IEEE J. Sel. Top. Quant. Elec., vol. 5 No. 5 pp. 1227-1236 (Sep./Oct. 1999).
Sun et al, IEEE Photonics Tech. Lett., vol. 10 No. 1 pp. 90-92 (Jan. 1998).
McGreer, IEEE Photonics Tech. Lett., vol. 8 No. 4 pp. 551-553 (Apr. 1996).
Avrutsky et al, IEEE Photonics Tech. Lett., vol. 10 No. 6 pp. 839-841 (Jun. 1998).
Alavie et al, IEEE Photonics Tech. Lett., vol. 5 No. 9 pp. 1112-1114 (Sep. 1993).
Fu et al, Opt. Lett., vol. 22 No. 21 pp. 1627-1629 (1997).
Wang et al, IEEE Photonics Tech. Lett., vol. 3 No. 1 pp. 36-38 (Jan 1991).
Wang et al Opt. Lett., vol. 15 No. 7 pp. 363-365 (Apr. 1990).
Wu et al, J. Lightwave Tech., vol. 10 No. 11 pp. 1575-1589 (Nov. 1992).
Eldada et al, IEEE Photonics Tech. Lett., vol. 12 No. 7 pp. 819-821 (Jul. 2000).
Chen et al, J. Lightwave Tech., vol. 10 No. 7 pp. 888-897 (Jul. 1992).
Minier et al, Diffraction characateristics of superimposed holographic gratings in planar optical waveguides, IEEE Photonics Tech. Lett., vol. 4 No. 10 p. 1115 (Oct. 1992).
Miya, IEEE J. Sel. Top. Quant. Elec., vol. 6 No. 1 pp. 38-45 (Jan./Feb. 2000).
Backlund et al, IEEE Photonics Tech. Lett., vol. 12 No. 3 pp. 314-316 (Mar. 2000).
Wiesman et al, IEEE Photonics Tech. Lett., vol. 12 No. 6 pp. 639-641 (Jun. 2000).
Ura et al, Integrated optical wavelength demultiplexer using a coplanar grating lens, Appl. Opt., vol. 29 No. 9 pp. 1369-1373 (Mar. 1990).
Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).
Babbitt et al, Opt. Lett., vol. 20 No. 8 pp. 910-912 (Apr. 1995).
Mossberg, Opt. Lett., vol. 26 No. 7 pp. 414-416 (Apr. 2001).
Tang et al, A novel wavelength-division-demultiplexer with optical in-plane to surface-normal conversion, IEEE Photonics Tech. Lett., vol. 7 No. 8 p. 908 (Aug. 1995).
Brady et al, Applied Optics, vol. 30 No. 17 p. 2324 (Jun. 1991).
Preston, "Digital holographic logic", Pattern Recognition, vol. 5, p. 37 (1973).
U.S. Appl. No. 11/676,273, filed Feb. 17, 2007 in the names of Greiner et al entitled Optical interconnect structures incorporating sets of diffractive elements.
U.S. Appl. No. 12/053,537, filed Mar. 21, 2008 in the names of Mossberg et al entitled "Etched surface gratings having an effective blaze angle".
U.S. Appl. No. 12/191,068, filed Aug. 13, 2008 in the names of Iazikov et al entitled "Etched surface gratings fabricated using computed interference between . . .".

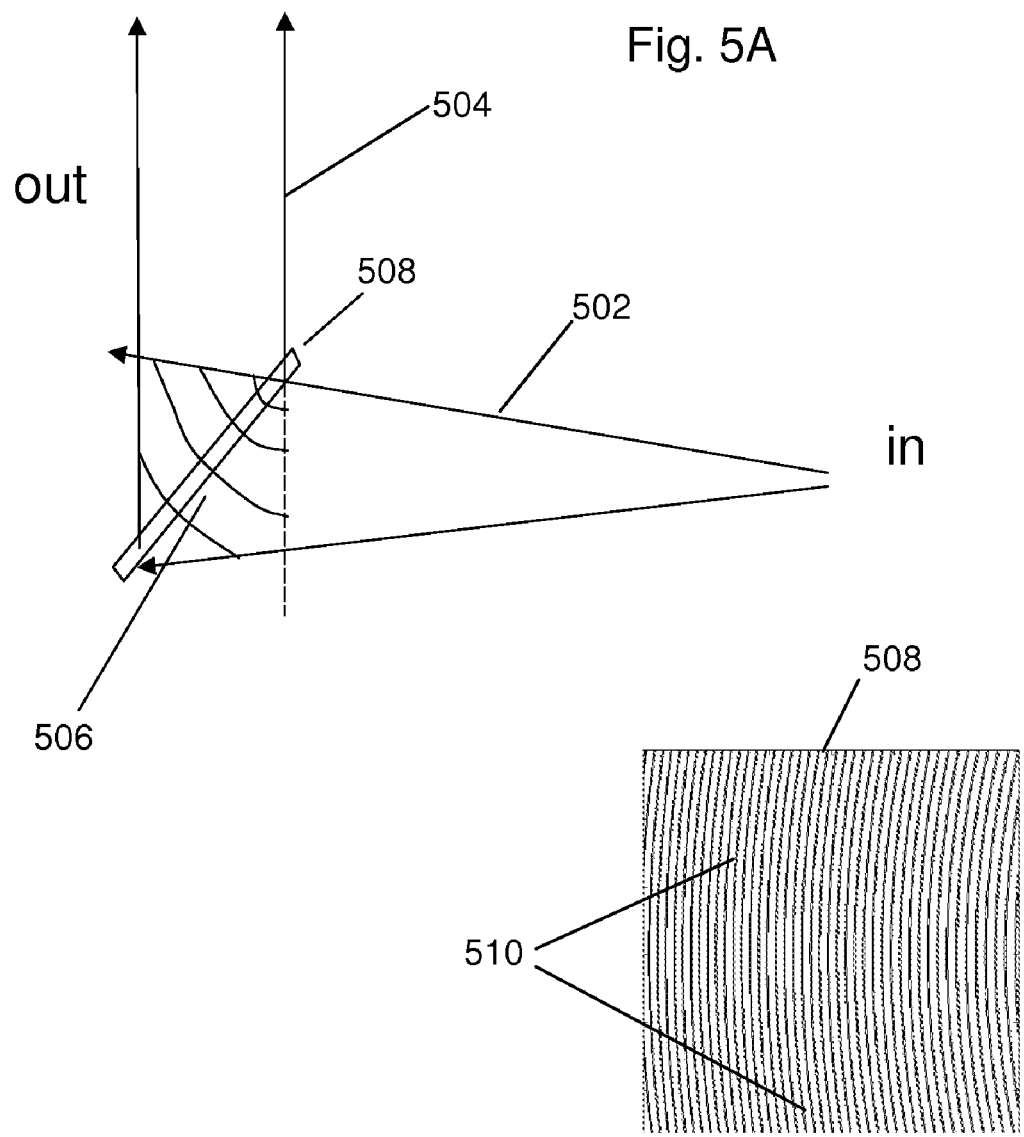

TRANSMISSION GRATINGS DESIGNED BY COMPUTED INTERFERENCE BETWEEN SIMULATED OPTICAL SIGNALS AND FABRICATED BY REDUCTION LITHOGRAPHY

BENEFIT CLAIMS TO RELATED APPLICATIONS

This application claims benefit of U.S. provisional App. No. 60/716,461 filed Sep. 12, 2005, said provisional application being incorporated by reference as if fully set forth herein.

BACKGROUND

The field of the present invention relates to optical devices incorporating distributed optical structures. In particular, distributed optical structures designed by computed interference between simulated optical signals and formed in or on a transmission grating are disclosed herein.

One or more distributed optical structures (i.e., sets of diffractive elements) in a transmission grating can be used in a variety of devices for spectral filtering, laser frequency control, spectral multiplexing, optical sensing, or other functions. It is often desirable that such devices be optimized, or nearly so, for routing, mapping, or coupling optical signals between input and output optical ports with minimal optical loss. Distributed optical structures designed by computed interference between simulated optical signals and formed in or on a transmission grating are disclosed herein that may enable such optimized routing, coupling, or mapping.

Various embodiments, implementations, and adaptations of diffractive element sets are disclosed in:

application Ser. No. 11/423,856 filed Jun. 13, 2006(now U.S. Pat. No. 7,224,867);
application Ser. No. 11/277,491 filed Mar. 25, 2006(now U.S. Pat. No. 7,190,856);
application Ser. No. 11/277,423 filed Mar. 24, 2005;
application Ser. No. 11/383,494 filed May 16, 2006(now U.S. Pat. No. 7,203,401);
application Ser. No. 11/376,714 filed Mar. 14, 2006;(now U.S. Pat. No. 7,349,599);
application Ser. No. 11/371,339 filed Mar. 7, 2006(now U.S. Pat. No. 7,327,908);
application Ser. No. 11/361,407 filed Feb. 23, 2006(now U.S. Pat. No. 7,116,453;
application Ser. No. 11/334,039 filed Jan. 17, 2006;
application Ser. No. 11/298,290 filed Dec. 9, 2005(now U.S. Pat. No. 7,330,614);
application Ser. No. 11/280,876 filed Nov. 15, 2005;
application Ser. No. 11/239,540 filed Sep. 28, 2005 (now U.S. Pat. No. 7,009,743);
application Ser. No. 11/213,345 filed Aug. 25, 2005(now U.S. Pat. No. 7,120,334);
application Ser. No. 11/210,439 filed Aug. 23, 2005; (now U.S. Pat. No. 7,359,597);
application Ser. No. 11/155,327 filed Jun. 16, 2005(now U.S. Pat. No. 7,190,858);
application Ser. No. 11/076,251 filed Mar. 8, 2005 (now U.S. Pat. No. 7,062,128);
application Ser. No. 11/062,109 filed Feb. 17, 2005(now U.S. Pat. No. 7,181,103);
application Ser. No. 11/055,559 filed Feb. 9, 2005(now U.S. Pat. No. 7,123,794);
application Ser. No. 11/021,549 filed Dec. 23, 2004(now U.S. Pat. No. 7,260,290);
application Ser. No. 10/998,185 filed Nov. 26, 2004 (now U.S. Pat. No. 6,993,223);
application Ser. No. 10/989,244 filed Nov. 15, 2004 (now U.S. Pat. No. 6,961,491);
application Ser. No. 10/989,236 filed Nov. 15, 2004 (now U.S. Pat. No. 6,965,716);
application Ser. No. 10/923,455 filed Aug. 21, 2004 (now U.S. Pat. No. 7,054,517);
application Ser. No. 10/898,527 filed Jul. 22, 2004(now U.S. Pat. No. 7,194,164);
application Ser. No. 10/857,987 filed May 29, 2004 (now U.S. Pat. No. 6,990,276);
application Ser. No. 10/842,790 filed May 11, 2004 (now U.S. Pat. No. 6,987,911);
application Ser. No. 10/798,089 filed Mar. 10, 2004 (now U.S. Pat. No. 6,823,115);
application Ser. No. 10/794,634 filed Mar. 5, 2004 (now U.S. Pat. No. 6,985,656);
application Ser. No. 10/740,194 filed Dec. 17, 2003(now U.S. Pat. No. 7,224,855);
application Ser. No. 10/653,876 filed Sep. 2, 2003 (now U.S. Pat. No. 6,829,417);
application Ser. No. 10/602,327 filed Jun. 23, 2003 (now U.S. Pat. No. 6,859,318);
application Ser. No. 10/229,444 filed Aug. 27, 2002 (now U.S. Pat. No. 6,678,429);
application Ser. No. 09/843,597 filed Apr. 26, 2001 (now U.S. Pat. No. 6,965,464); and
application Ser. No. 09/811,081 filed Mar. 16, 2001 (now U.S. Pat. No. 6,879,441).

These reference indicate the state of the art available for forming diffractive elements, and may be applicable to formation of diffractive elements of a transmission grating according to the present disclosure. A publication entitled "Planar holographic optical processing devices" (T. W. Mossberg, Opt. Lett. 26 414 (2001)) is incorporated by reference as if fully set forth herein.

For one or more of the references listed hereinabove, it may be the case that the devices, structures, embodiments, implementations, adaptations, procedures, or techniques disclosed therein may be employed, within the scope of the present disclosure or appended claims, for implementing a transmission grating.

SUMMARY

A method comprises computing an interference pattern between a simulated design input optical signal and a simulated design output optical signal, and computationally deriving an arrangement of at least one diffractive element set from the computed interference pattern. The interference pattern is computed in a transmission grating region, with the input and output optical signals each propagating through the transmission grating region as substantially unconfined optical beams. The arrangement of the diffractive element set is computationally derived so that when the diffractive element set thus arranged is formed in or on a transmission grating, each diffractive element set would route, between corresponding input and output optical ports, a corresponding diffracted portion of an input optical signal incident on and transmitted by the transmission grating. The method can further comprise forming the set of diffractive elements in or on the transmission grating according to the derived arrangement.

An optical apparatus comprises an optical transmission diffraction grating having at least one set of diffractive elements. The diffractive elements of the set are arranged on the transmission grating relative to corresponding contours computationally derived from an interference pattern resulting from computed interference between a simulated design input optical signal and a simulated design output optical signal. The diffractive elements of the set are configured so as to result in a diffractive amplitude spatial distribution substantially corresponding to a computationally derived design diffractive amplitude spatial distribution.

Objects and advantages pertaining to design of diffractive element sets by computed interference between simulated optical signals may become apparent upon referring to the disclosed exemplary embodiments as illustrated in the drawings and disclosed in the following written description and/or claims.

BRIEF DESCRIPTION OF THE DRAWINGS

FIGS. 5A and 5B illustrate schematically simulated design input and output optical signal beams and the resulting transmission grating, respectively.

Figure 1:
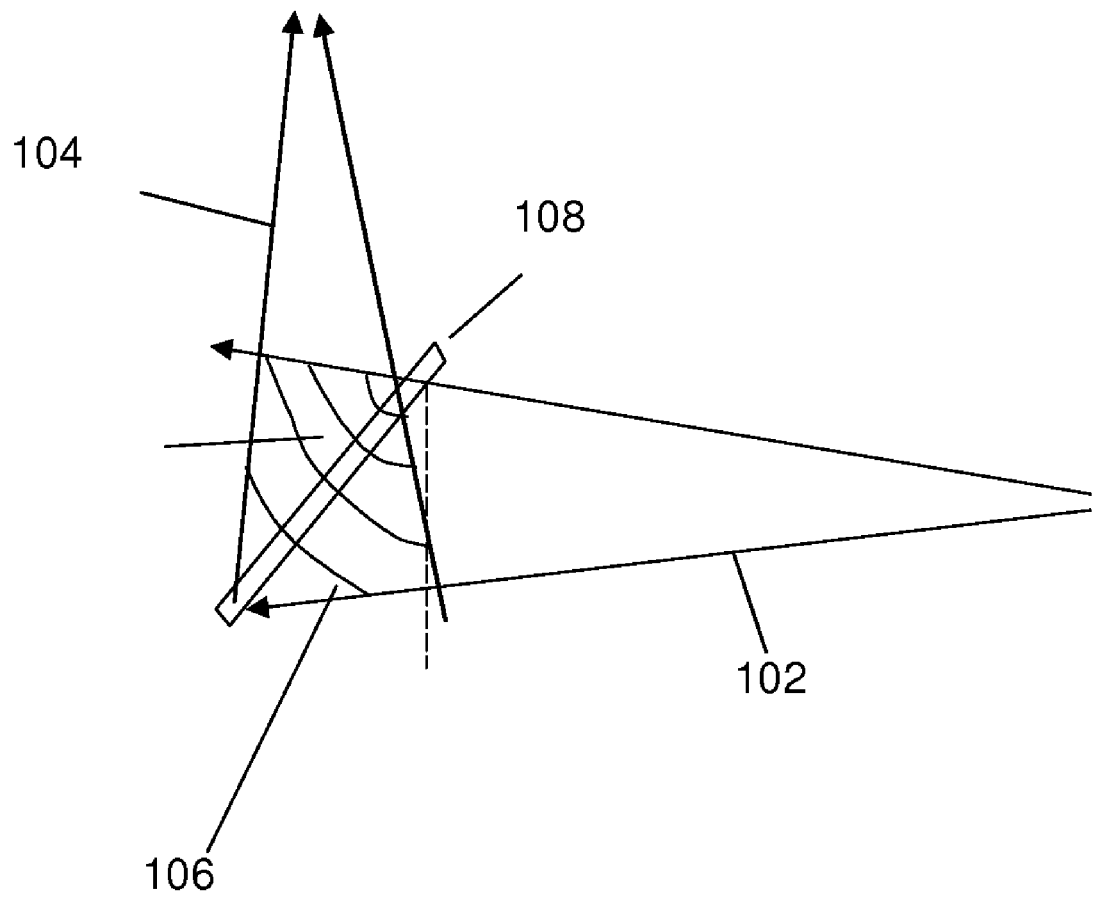
FIG. 1 illustrates schematically simulated design input and output optical signal beams.

In the Figures, typically only a few diffractive elements are shown out of an entire diffractive element set, which may contain anywhere from a few, dozens, hundreds, or even thousands of diffractive elements. The Figures may illustrate the transmission grating or diffractive elements schematically and therefore may not show all structures in their proper shape or proportions. The lines or curves representing the diffractive elements, or the contours defining them, do not necessarily represent their actual shapes. In particular, straight lines in some of the Figures may in fact represent elements or contours that may be curved in actual devices, and vice versa. In many of the Figures, a transmission grating and the diffractive elements thereof are shown in cross section.

It should be noted that while many of the exemplary embodiments shown or described herein have a diverging input beam mapped into a converging output beam, the present disclosure or appended claims also encompass embodiments in which input and output beams may include any desired combination of converging, diverging, or substantially collimated beams. It should be further noted that input and output beams need not have simple spherical or planar wavefronts. Any diffraction guided beam appropriate to the desired application may be used as one of the simulated input and output beams.

It should be noted that many of the Figures depict simulated design input and output generating fields and the resulting design interferogram. However, many of these Figures may also be viewed as depicting a simulated input probe field, a simulated diffractive element set modeled according to the design interferogram, and a calculated output field, or instead as depicting actual, physical device input and output signals and the actual, physical diffractive element set fabricated according to the design interferogram.

The embodiments shown in the Figures are exemplary, and should not be construed as limiting the scope of the present disclosure or appended claims.

DETAILED DESCRIPTION OF EMBODIMENTS

An optical apparatus according to the present disclosure comprises a transmissive optical element having at least one set of diffractive elements, which can also be described as a transmission grating. The optical element allows propagation of optical signals therethrough substantially unconfined in all three spatial dimensions (i.e., free-space propagation). This is in contrast to one- or two-dimensional waveguide structures (i.e., planar waveguides) that confine propagating optical signals in two or one transverse dimensions, respectively, and are described extensively in various of the references listed above. The transmission grating is generally formed on or from a substrate of some sort, which may be substantially flat or may be somewhat curved, bent, or deformed.

The set of diffractive elements of the transmission grating can also be referred to as a thin hologram or other equivalent term of art. Each diffractive element of the set may comprise one or more diffracting regions thereof that diffract, reflect, scatter, route, redirect, absorb, phase shift, or otherwise alter portions of an incident optical signal (said process hereinafter simply referred to as diffraction). For a transmission grating, the diffracting regions of each diffractive element of the set typically comprises some suitable alteration of the transmission grating (ridge, groove, index modulation, density modulation, and so on), and is spatially defined with respect to a virtual one- or two-dimensional linear or curvilinear diffractive element contour, the various shapes and positions of the contours typically being configured to impart desired spatial or spectral characteristics onto the diffracted portion of the optical signal. It should be noted that the terms "diffractive contour" and "diffractive element" are sometimes used interchangeably in the present disclosure. Implementation of a diffractive element with respect to its virtual contour may be achieved in a variety of ways, including those disclosed in the references listed above.

Each linear or curvilinear diffractive element is contoured and positioned so that the set collectively directs a diffracted portion of the optical signal to an output optical port. The relative spatial arrangement (e.g., spacing, relative curvature, etc.) of the diffractive elements of the set, and the relative amplitude diffracted from each diffractive element of the set, yield desired spatial, spectral, and/or temporal characteristics for the overall diffracted optical signal routed between the corresponding input and output optical ports. It should be noted that an optical port (input and/or output) may be defined structurally (for example, by an aperture, waveguide, fiber, lens, or other optical component) and/or functionally (for example, by a spatial location, by convergence, divergence, or collimation, and/or by propagation direction).

It should be noted that the terms input and output are used only for convenience of description. Transmission gratings disclosed herein typically exhibit reciprocal behavior, enabling in some cases interchange of the input and output designations of the optical ports. When a transmission grating is described as spatially dispersing an input signal relative to wavelength, the output port can include multiple distinct spatial locations with different input wavelengths directed to different output spatial locations. This can enable, for example, a plurality of input wavelengths to be detected or monitored simultaneously through the deployment of a detector array having detection elements spatially coincident with corresponding wavelength-specific output ports.

The diffractive elements of the set (or equivalently, their corresponding contours) are spatially arranged with respect to one another so that the corresponding portions of the optical signal diffracted by each element interfere with one another at the output optical port, so as to impart desired spatial, spectral, and/or temporal characteristics onto the portion of the optical signal collectively diffracted from the set of diffractive elements and routed between the input and output optical ports. The diffractive elements of the transmission grating can be regarded as spaced in a plane not containing the direction of the central ray of the input optical signal, and a given spatial portion of the wavefront of such a signal therefore interacts with only one or only a few adjacent diffractive elements.

As set forth in prior-filed co-pending application Ser. No. 10/998,185 (cited hereinabove), diffracting regions of a diffractive element set may be distributed over one or more spatial regions of the transmission grating, for facilitating placement of multiple diffractive element sets in a single grating. These spatial regions may be positioned and arranged so as to impart desired spatial, spectral, or temporal characteristics onto the corresponding routed portions of an incident optical signal. The word "primitive" may be used to designate one diffractive element set among multiple diffractive element sets in a single transmission grating (e.g., a single transmission grating may include multiple "primitive diffractive element sets").

A given set of diffractive elements of the transmission grating can provide dual functionality, i.e., spatially or angularly dispersing a diffracted portion of an optical signal and transforming its spatial wavefront to create an output optical beam. The diffractive element set can be designed (by computer generation, for example) so as to provide optimal routing, imaging, or focusing of the optical signal between an input optical port and a desired output optical port. Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references listed above. The following are exemplary only, and are not intended to be exhaustive. The teachings of the present disclosure pertaining to design of diffractive element sets of a transmission grating can be implemented regardless of the method(s) employed for forming the grating or the diffractive element set(s) thereof. The teachings of the present disclosure enable the design of a wide range of transmission gratings incorporating diffractive element sets for general wavefront and directional transformations between input and output beams.

Diffractive elements can be formed by projection lithography using a mask or reticle patterned with a scale version of the diffractive element set(s) to be formed as part of the transmission grating. It should be noted that lithographic techniques can be employed to fabricate multiple devices in a single exposure, potentially enabling ready scale-up of manufacturing to large numbers of transmission gratings. The mask can be of any suitable type (e.g., scribed or otherwise patterned chromium on a fused silica substrate) and can be used to form the diffractive element set on a photosensitive material (e.g., photoresist coated onto a silicon wafer or fused silica substrate). The mask or reticle can be fabricated by any suitable method that provides substantial spatial coherence on a length scale required for a specific device to achieve needed or desired spectral or spatial resolution. The mask pattern can be imparted onto a photosensitive material or substrate using projection lithography with a magnification or reduction factor chosen to yield the desired design length scale for the diffractive elements thus formed. In particular, using projection photolithography (wherein the size of the mask pattern imparted onto the substrate to form the diffractive elements is reduced relative to the pattern on the mask itself) enables a computationally-derived diffractive element design to be readily patterned onto the mask on a size scale convenient to available pattern-writing tools, while nevertheless enabling fabrication of the diffractive elements of the transmission grating on a smaller size scale. The diffractive elements can be formed directly by exposure of the photosensitive material, or patterning of the photosensitive material can be employed to form an etch mask for subsequent processing of the substrate. Transmission gratings as described herein can also be formed using any other suitable method or combination of methods of spatially-selective material processing, for example mechanically or by laser writing, e-beam writing, contact printing, or lithography (with unity reduction ratio, magnified, or reduced as appropriate). For example, a transmission grating can be formed by electroplating, molding, stamping, impressing, embossing, or other mechanical processes using a master formed mechanically or by laser writing, e-beam writing, lithography (including projection photolithography, with unity reduction ratio, magnified, or reduced as appropriate). In another example, a transmission grating comprising free-standing gold bars or filaments can be produced from a master grating as described in a publication of Schattenburg et al entitled "X-ray/VUV transmission gratings for astrophysical and laboratory applications" (Phys. Scripta vol. 41 pp. 13-20, 1990). Said publication is incorporated by reference as if fully set forth herein.

The curvilinear shape of the diffractive element contours may be determined by a variety of standard optical imaging system design tools or from calculated interference of simulated design optical beams. Simple curves (e.g., conic sections) may be employed as approximations of fully optimized contours. Diffractive element virtual contours may be spaced by an optical path difference (as described in various of the references listed above) that results in the optical field diffracted by successive diffractive elements to be substantially in phase along the wavefronts of a designed output signal at a design wavelength. If the overall response of the diffractive element set is to be apodized with amplitude and/or phase modulation (to yield a desired spectral transfer function or impulse response function), the optical spacing of successive diffractive element contours can be controlled to provide required phase differences between corresponding diffracted output signal components at the output port, and/or the diffractive strength of the elements can be individually controlled as well (as described in detail in various of the references listed above).

A diffractive element set of a transmission grating for transforming a design input optical signal into a design output optical signal can be designed by calculating an interference pattern between simulated input and output optical signal fields at a desired wavelength and with desired spectra, temporal waveforms, or spatial wavefronts entering and exiting the diffractive transformation region of the transmission grating. In some instances the simulated optical signals are substantially monochromatic. In forming or writing a summed pattern for the diffractive element set, suitable discretization is applied as needed for any lithographic or UV exposure approach that is utilized for fabrication. The holographic structure (i.e., distributed diffractive structure) can be designed by interference of computer-generated beams having the desired computer-generated temporal waveforms (explicitly time-dependent or continuous-wave), with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform. Various exemplary embodiments of such interferometric design of diffractive element sets are set forth hereinbelow and in the accompanying Figures. In some embodiments of transmission gratings disclosed herein, it may be desirable to preserve the spectral and temporal properties of input and output signals. To achieve that goal, simulated design fields typically are employed having a temporal width sufficiently short to fill the design operational bandwidth. Alternatively, a diffractive element set for a transmission grating can be designed using continuous wave design fields and spatially apodized according to the references listed above to provide desired spectral and temporal transformation properties. It should be noted that when a wavefront transformation diffraction pattern is calculated for a single wavelength, the pattern thus calculated typically will exhibit wavelength dispersion, manifested as wavelength-dependent variation of angular direction of the output optical signal, wavelength-dependent variation of the distance from the diffractive element set to a focal point of the output optical signal, or a combination of these.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped as they propagate across or through the substrate material (referred to herein as holographic photoexposure), thereby recording on the transmission grating substrate an interference pattern. Subsequently the photosensitive material is developed. For fabrication of a transmission grating by holographic photoexposure, writing beams can be employed having the same properties and characteristics as the input and output beams to be controlled by the fabricated device.

The phrase "operationally acceptable" appears herein describing levels of various performance parameters of transmission gratings or diffractive element sets thereof. Such parameters may include diffraction efficiency, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a lower diffraction efficiency may be an acceptable trade-off for achieving lower device fabrication costs in some instances, while higher diffraction efficiency may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "so as to substantially avoid undesirable optical coupling", and so on as used herein shall be construed in light of this notion of "operationally acceptable" performance.

In the present disclosure are disclosed methods for designing and fabricating diffractive element sets as well as a broad range of diffractive element set geometries. Diffractive element sets designed according to the disclosed methods may efficiently map or couple virtually any input optical wavefront into any desired output optical wavefront, whether the input and output signals propagate in the same, opposite, or in angled directions, whether the input and output ports or sources are spatially extended or point-like, or whether the input-to-output mapping or coupling occurs under conditions wherein a paraxial approximation would be appropriate. In order to achieve optimal or near-optimal mapping or coupling of input and output optical signal modes, the virtual contours defining the diffractive elements are typically complicated and may be calculated by computation of interference between simulated optical fields representing the input and output optical signal beams that the diffractive element set is intended to couple.

The diffractive element sets (also referred to as distributed optical structures) designed as disclosed herein may provide substantially full waveform or wavefront reconstruction and/or manipulation of input fields. Such may be achieved under conditions (e.g. non-paraxial limit or extended optical sources) where simple imaging structures (e.g. conic sections) may not provide sufficiently optimized mapping or coupling, and may enable substantially optimized beam routing or highly efficient coupling to or from various output media (e.g. fiber or channel waveguides). Such waveform or wavefront control can facilitate or enable separation of angularly dispersed output optical signals, which in turn can simplify construction of spectrometers or similar devices. For example, a single substantially flat transmission grating configured according to the present disclosure can serve to both angularly disperse different wavelengths present in an optical signal and to separate the dispersed wavelength components, e.g., by focusing, thereby eliminating the need for extra focusing optics or for a curved diffraction grating in the spectrometer. The diffractive element sets disclosed herein may also enable beam mapping or coupling geometries by a transmission grating such as: acute-, right-, or obtuse-angle bends; or forward-focusing or relaying structures. Diffractive element sets designed as disclosed herein may also enable high-fidelity mapping of spatially extended optical sources (i.e. non-paraxial or non-point-like), or may enable novel beam mapping or coupling functions, such as efficiently converting one mode into another one of different size or profile. Diffractive element sets designed as disclosed herein may also be employed to provide aberration correction for any other wavefront shaping optical elements used in combination with the transmissive grating. For example, an aberrated beam from a preceding optical element used as an input design beam combined with an aberration-free output design beam will produce the desired wavefront transformation.

FIG. 1 illustrates schematically a method for designing a transmission grating with a set of diffractive elements for generating a desired output optical signal beam from a desired input optical signal beam incident on the diffractive element set and transmitted by the transmission grating. At the wavelength of interest, a mathematically-simulated design input optical field 102 exhibiting spatial and spectral properties of the desired input optical signal beam is computationally interfered with a mathematically-simulated design output optical field 104 exhibiting spatial and spectral properties of the desired output optical beam. "Mathematically-simulated" may denote an optical signal simulated analytically or numerically, while "computation" may denote analytical computation or numerical computation. The input and output fields may be given by the real part of:

$$E_{1,2}(\bar{x}, t) = S_{1,2}(\bar{x})T_{1,2}\left(t - \frac{\partial \bar{k}_{1,2}(\bar{x})}{\partial \omega_{1,2}} \cdot \bar{x}\right)\exp i(\omega_{1,2}t - \bar{k}_{1,2}(\bar{x}) \cdot \bar{x}) \quad (1)$$

where $S_i$ is a spatial mode field amplitude distribution, $T_i$ is a temporal envelope, $\omega_i$ is the optical frequency, $k_i$ is the modal wavevector spatial distribution, and $\partial k_i/\partial \omega_i$ is the inverse of the group velocity. Note that $S_i$ and $k_i$ are related in a manner that satisfies Maxwell's equations, while $\omega_i$, $k_i$, and $\partial k_i/\partial \omega_i$ are related by the dispersion properties of the medium in which the signals propagate. In general the product of $S_i$ and $T_i$ may be normalized in any suitable way. If the optical signals are continuous-wave (cw), then $T_i$ is constant for both signals (assume $T_i=1$). In a first computational step for such continuous-wave optical signals with $\omega_1 \cong \omega_2$, an optical interference pattern between the two optical signal fields is calculated as:

$$I(\bar{x}, t) = (E_1(\bar{x}, t) + E_2(\bar{x}, t))(E_1(\bar{x}, t) + E_2(\bar{x}, t))^* \quad (2)$$
$$= |S_1(\bar{x})|^2 + |S_2(\bar{x})|^2 + 2|S_1(\bar{x})||S_2(\bar{x})|\cos(\Delta \bar{k}(\bar{x}) \cdot \bar{x} + \varphi(\bar{x}))$$

where $\Delta k \equiv k_2 - k_1$ and $\phi \equiv \text{Arg}(S_1 S_2^*)$ (all functions of position). Designs for various types of diffractive element sets may be derived from the interference pattern in several ways. In many examples (but not all), the first two terms of Eq. 2 are discarded, and a diffractive element design is derived from the third term of Eq. 2 (referred to as the interferogram, which spans an interference region 106). In the case of a transmission grating, only the portion of the full, three-dimensional interferogram that intersects a design surface (coinciding with grating substrate 108) is used as a basis for the design of the diffractive elements of the transmission grating.

For the specific case of two interfering fields, the interferogram may be decomposed into three factors: a first magnitude factor $|S_1(x)|$, which spatially varies in proportion to the magnitude of the simulated design input optical field; a second magnitude factor $|S_2(x)|$, which spatially varies in proportion to the magnitude of the simulated design output optical field; and a phase factor $\cos(\Delta k \cdot x + \phi)$, which depends on the phase difference between the simulated design input and output optical fields and which typically varies spatially on a relatively rapid scale. The product $|S_1(x)||S_2(x)|$ may be referred to as the calculated interferogram intensity function, while $\cos(\Delta k \cdot x + \phi)$ may be referred to as the interferogram phase function. In many instances only the interferogram phase function is employed for designing a diffractive element set, while in other instances the interferogram intensity function or one of the individual magnitude factors may be employed as well. It is understood that the mathematical expression given for simulated design input and output fields is only one possible expression for such fields and others may be used as well. In all cases, an interference pattern may be calculated, which may be decomposed into terms analogous to those given above. Any suitable mathematical expressions for simulated design optical beams or the resulting interference pattern or interferogram shall fall within the scope of the present disclosure.

Optical fields used for interference pattern generation may be realizable by physical sources, however, the present disclosure also encompasses use of simulated design fields that are merely theoretical and may or may not be conveniently obtainable with actual light sources or in the transmission grating geometries of interest. Moreover, when using actual optical signals to generate an interference pattern, it is not possible to drop the first two terms of Eq. 2 to isolate the interferogram, as is possible when using simulated optical signals. Many of the exemplary embodiments shown and described herein may include the use of only two simulated design fields to generate the interference pattern. More generally, three or more simulated optical fields may be employed for forming an interference pattern and for designing diffractive element sets, and such use of three or more simulated design optical fields shall fall within the scope of the present disclosure or appended claims. Such multi-beam-interference-designed distributed optical structures may be useful for coupling multiple input signals to a single output port, a single input signal to multiple output ports, or multiple inputs each to one or more outputs.

A design for a diffractive element set may be derived from the interferogram where it intersects a design surface of interest. A diffractive element set in a transmission grating can be regarded as a two-dimensional spatial distribution of optical field transmission amplitude or relative phase shift, which may also be referred to collectively as a diffractive strength distribution. It should be noted that transmission amplitude and relative phase shifts in some instances can be interchanged, as when the net transmitted amplitude of two or more coherent portions of diffracted optical signal depends on the relative phase of those portions of the signal. The diffractive strength distribution is derived computationally from the interferogram by a well-defined mapping of the value of the interferogram (either as originally generated from the simulated fields or suitably modified thereafter) at a given position to an optical field transmission coefficient value at that position. The diffractive strength distribution may be realized physically in various ways, many of which are described in the various references listed above, and some of which are described briefly hereinbelow. Typically, a diffractive element set comprising the diffractive strength distribution is fabricated in the form of a two-dimensional refractive index distribution in the transmission grating substrate, a two-dimensional distribution of substrate surface relief features or substrate thickness, or a set of free-standing curvilinear bars or filaments supported by a mesh or frame. A surface relief structure can be formed on an exposed, outer surface of the transmission grating, or can be formed at an internal interface between differing materials within the transmission grating. Such distributions can be fabricated in various ways, e.g., by etching trenches into or through the grating substrate, by using an electroplating process to form bars or filaments, by etching a relief structure on a substantially transparent grating substrate, by photomodification of the local refractive index (either direct or with a phase mask) in a transparent grating substrate, and so on.

Figure 2:
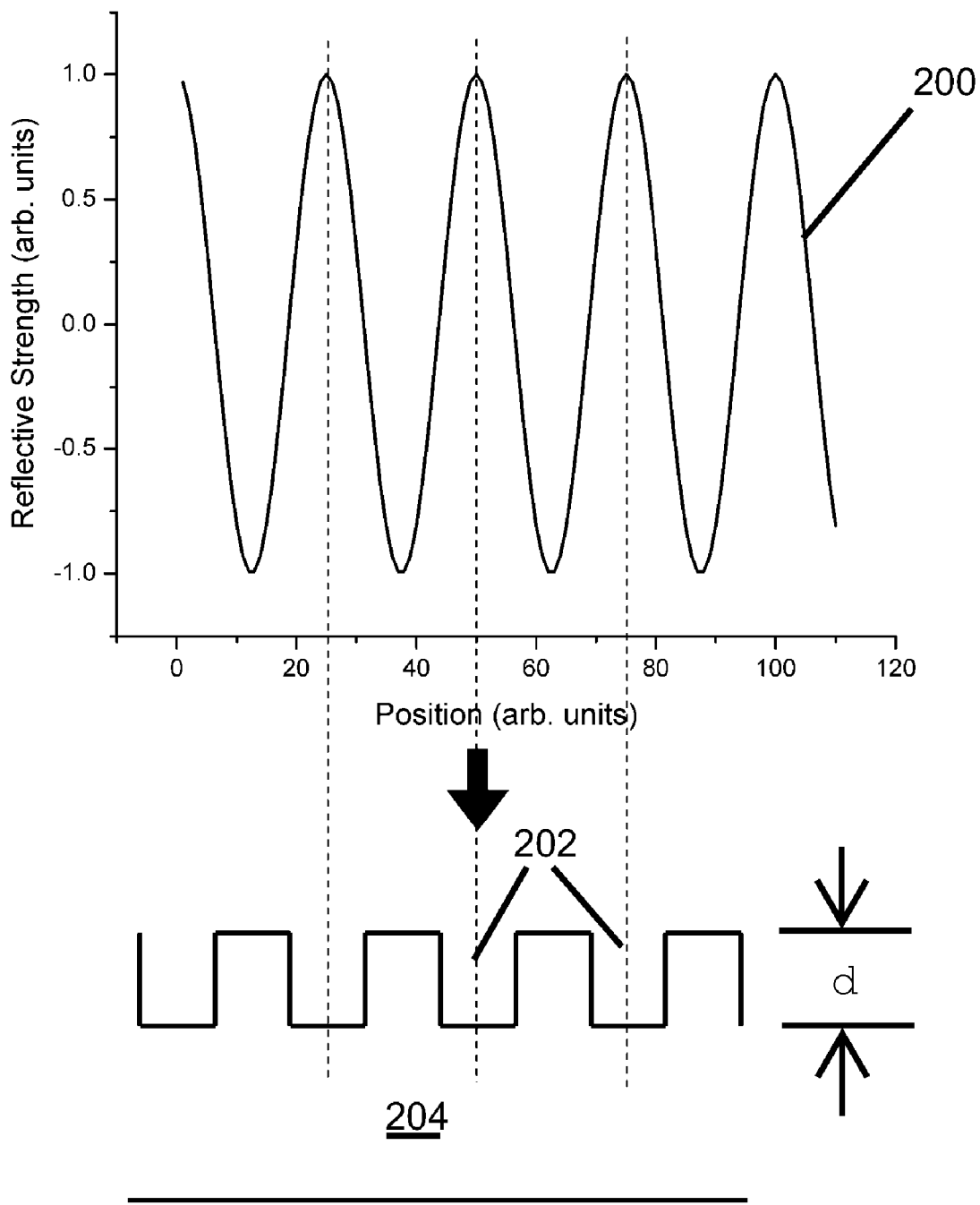
FIG. 2 illustrates an exemplary interferogram phase function and a schematic cross-section of corresponding diffractive elements and their positions relative to the interferogram.
Figure 3:
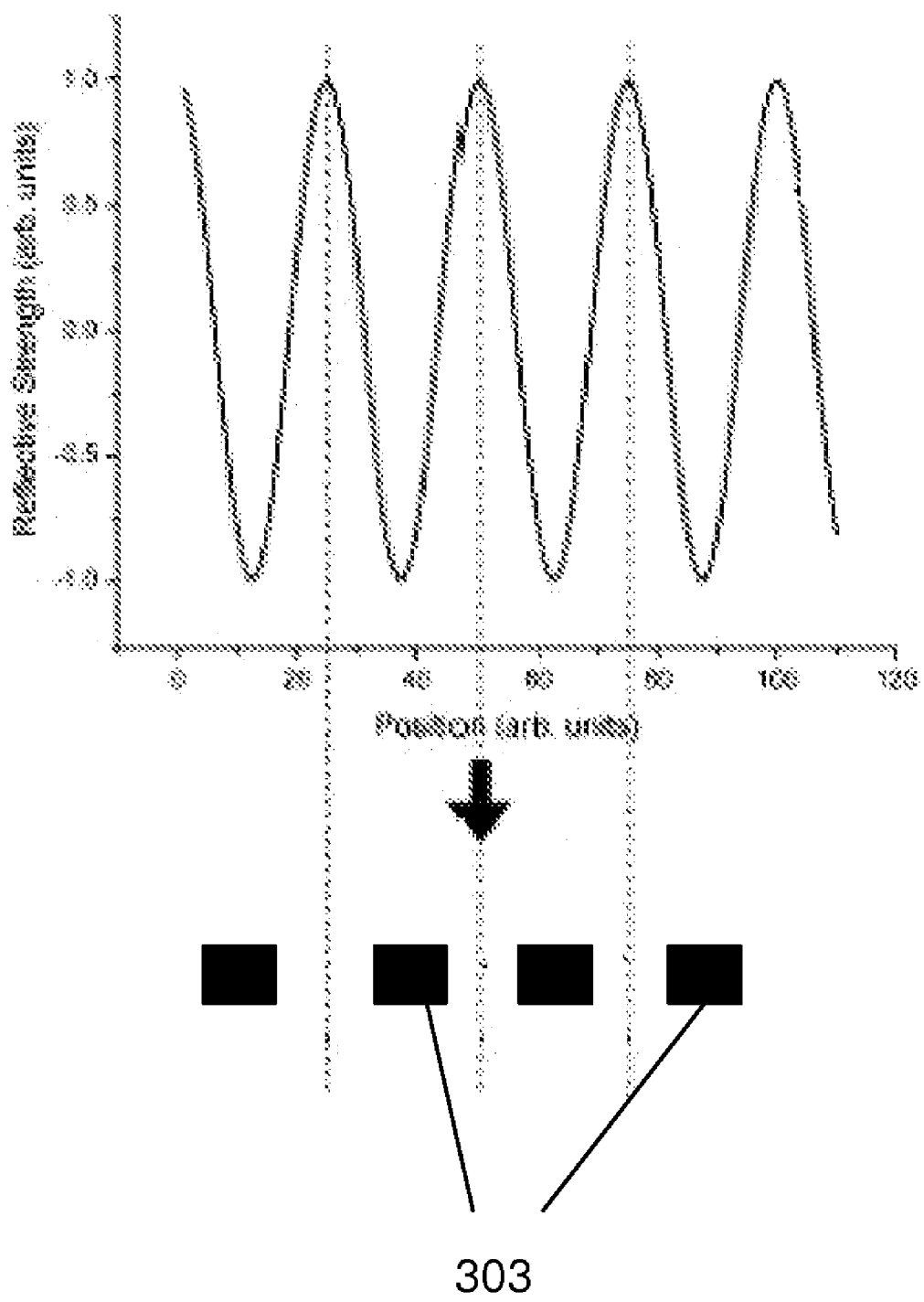
FIG. 3 illustrates an exemplary interferogram phase function and a schematic cross-section of corresponding diffractive elements and their positions relative to the interferogram.

It is often the case that the diffractive element set (or equivalently, the diffractive strength distribution or the refractive index distribution) may be designed and formed according to the computed interferogram phase function alone. The interferogram phase function can be translated or mapped into a suitable refractive index distribution, transmission distribution, phase distribution, thickness distribution, surface relief distribution, and so on by faithfully replicating the explicit functional dependence of the trigonometric function of the interferogram phase function, or by approximating the trigonometric function of the interferogram phase function by other functions such as a step function, sawtooth function, triangular function, or other approximating function, or by any other suitable algorithm. Alternatively, the continuous, analog interferogram phase function can be approximated by a finite number of discrete levels of diffractive strength or refractive index variation. In one example, the phase function of the interferogram may be digitized by using only points corresponding to local maxima of the phase function 200 (as in the upper portion of FIG. 2). The resulting set of contours comprises contour lines on which the phase difference between the two interfering simulated optical beams is zero. Contours defined by values other than zero for the interferogram phase function could be employed as well. A set of diffractive elements can be fabricated by forming diffractive elements positioned relative to these virtual contours so as to yield a desired spectral or temporal transfer function for the diffractive element set. A first order grating results when diffractive elements are formed for every virtual contour; alternatively, a higher order transmission grating can be fabricated by forming diffractive elements positioned relative to every second, third, or higher integer virtual contour. In an example of a first order transmission grating, trenches 202 (shown in cross-section in the lower portion of FIG. 2) can be etched on the substantially transparent grating substrate 204 along each of the zero-phase-difference contours. The computed contour line may be used as a center or an edge or another part of the trench constituting the diffractive element. The optical thickness d (i.e., optical depth) of the lines can be chosen to be an integer multiple (including unity) of one-half the design optical wavelength thus suppressing even-order diffraction. Other values of trench depth can be employed. Any suitable width can be chosen for such trench-like diffractive elements; in the example of FIG. 2, each trench is approximately one-half the spacing between adjacent contours. Other suitable widths can be employed as well. The width of each trench can vary along its length to introduce spatially dependent diffractive amplitude control. The trench can be divided along its length into segments that are individually displaced relative to the corresponding contour, either by translation or rotation. The trench can be divided into etched and non-etched segments. Entire trenches can be shifted relative to their corresponding contours, individually or as correlated sets. These and other methods for varying the diffractive amplitude of diffractive elements are disclosed in various of the references listed above, and can be employed with other methods for forming the diffractive elements besides etching trenches. For example, FIG. 3 illustrates schematically a set of non-transmissive diffractive elements formed as free-standing metal bars or filaments 303, with each filament being centered on a computed contour line having width and thickness substantially equal to about one-half of the contour spacing. It should be noted in all of these descriptions that "contour spacing" or "element spacing" can be defined locally for a diffractive element set of a transmission grating, and can vary with position on the grating if needed or desired to achieve a designed input-to-output transfer function.

The calculated interferogram intensity function or one of the individual magnitude factors thereof may be utilized in several different ways for computationally deriving a design diffractive amplitude for the diffractive elements of the set. First, as already disclosed hereinabove, the calculated interferogram intensity function may not be used at all but rather set to unity, so that the design of the diffractive element set arises from the interferogram phase function only (i.e., substantially constant diffractive amplitude among the elements of the set). Second, the calculated interferogram intensity function may be used in combination with the interferogram phase function. In this second example, along the zero phase difference (or other chosen constant phase difference) contours, the value of the diffractive amplitude distribution varies in proportion to the product of the simulated design optical field magnitudes. In a variation of this second example, a relative scaling factor for the simulated field magnitudes may be introduced. Third, the value of the diffractive amplitude distribution varies in proportion to the magnitude of one or the other (but not both) of the simulated optical fields. Fourth, the interferogram intensity function may be replaced by an entirely different function for the diffractive amplitude (computationally derived or otherwise chosen to yield a desired spatial, spectral, or temporal transfer function and often referred to as an apodization function), which when combined with the interferogram phase function results in a desired diffractive strength distribution. These scenarios are described further hereinbelow.

Figure 4:
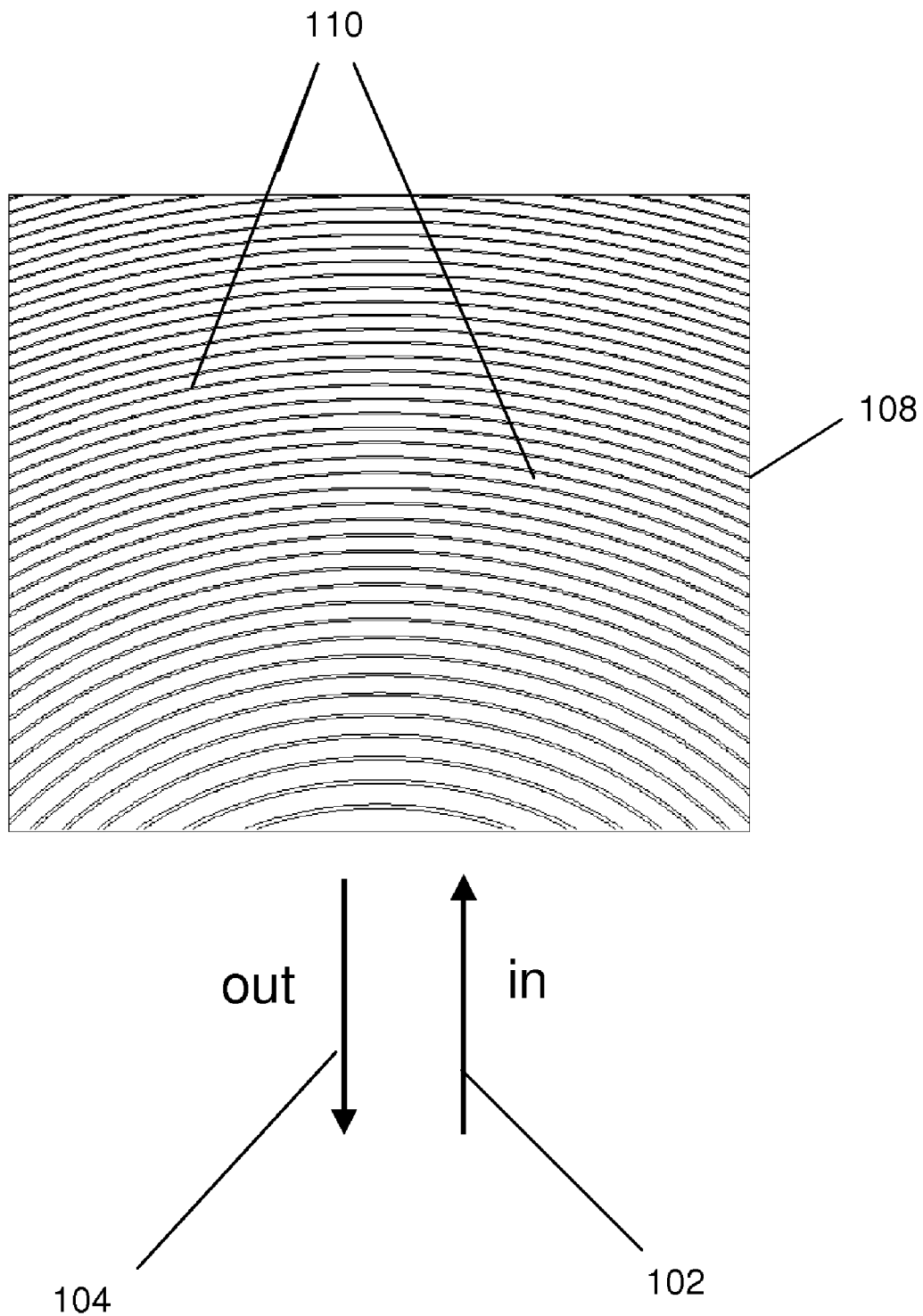
FIG. 4 illustrates schematically an exemplary transmission grating.

FIG. 4 depicts the diffractive elements 110 formed on a grating substrate 110 along contours derived from an interferogram calculated with simulated input and output beams having the geometry substantially as shown in FIG. 1, i.e., with a diverging input beam 102 transformed to a converging output beam 104. For ease of description, it is assumed that a vector normal to the substrate 108 with the diffractive elements 110 and the central propagation vectors of the input beam 102 and the output beam 104 are coplanar (i.e., all lie in a common plane of incidence). This need not always be the case; the respective planes of incidence defined by the input beam and the output beam can assume any desired geometrically-permitted angle with respect to one another. The diffractive contours are defined by constant phase difference contours of the interferogram. The geometry of the diffractive elements 110 on the transmission grating substrate 108 shown in FIG. 4 results in focusing of a divergent input beam 102 into a converging output beam 104 (as in FIG. 1). An input beam having a wavelength differing from the design wavelength incident on the distributed diffractive structure along the design direction results in a similarly converging output beam angularly displaced in the plane of incidence with a spatially shifted focal spot. The transmission grating having a diffractive structure like that shown in FIG. 4 can be employed to provide spectrometer-like functionality employing only a single optical component.

FIG. 5A depicts schematically generation of a diffractive contour pattern computed from an interferogram between the shown divergent input beam 502 and a substantially collimated output beam 504. The central propagation vectors of input and output beams 502 and 504 and a vector normal to the transmission grating substrate 508 are assumed to lie in a common plane of incidence (again, for ease of description only; this need not generally be the case). In FIG. 5B, a normal view of the transmission grating substrate 508 with diffractive elements 510 formed along the derived diffractive contours is shown. Oval-like structures that may appear in FIG. 4 or 5B are artifacts of the printing/display method.

In addition to the design configurations depicted schematically in the Figures, many other configurations can be implemented employing a transmission grating with interferometrically designed diffractive elements. Examples can include any combination of converging, diverging, or collimated input and output beams and any combination of incidence angles and relative incidence planes.

In general, the diffractive elements formed on a substantially planar transmission grating take the form of curved lines having a chirped spatial period (i.e., line spacing between successive diffractive elements that varies spatially across the set). In cases when the input and output beams lie in a common plane of incidence, the wavefront transformation properties of the transmission grating can be roughly decomposed into two parts. In the direction normal to the plane of incidence, the curvature of the diffractive elements results in wavefront transformation. In the direction parallel to the plane of incidence, the spatial chirp of the diffractive contour spacing provides wavefront transformation. This rough decomposition is approximately true when the input and output beams propagate in directions substantially differing from those expected for simple specular reflection from the grating substrate. The scope of the present disclosure and appended claims shall not be limited to instances wherein such a distinction can be made.

Figure 6A:
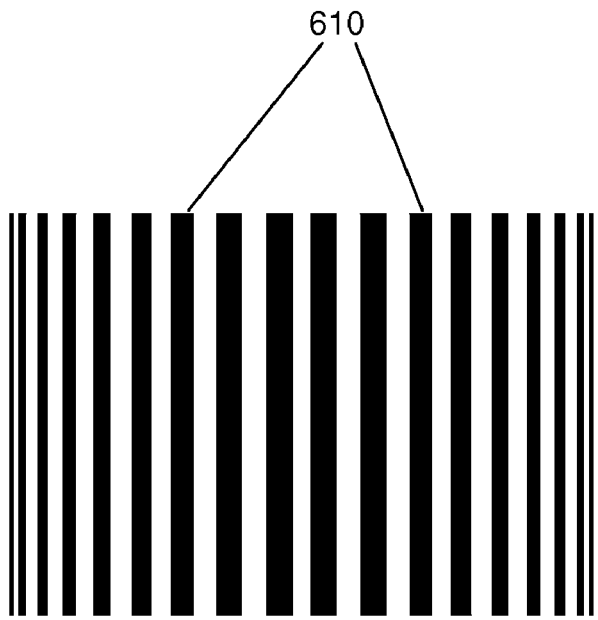
FIGS. 6A and 6B illustrate schematically a spatially chirped transmission grating, and output optical beams resulting from an input optical beam incident on a transmission grating, respectively.
Figure 6B:
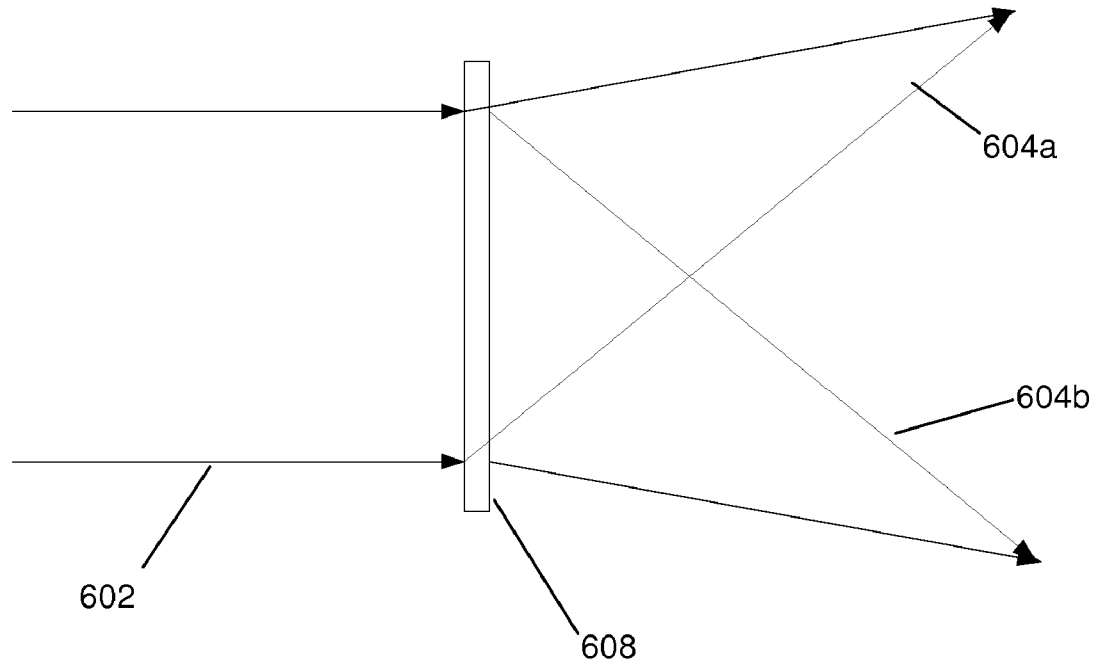

Straight line diffractive contours 610 can exhibit wavefront transformation properties if the spacing between the diffractive elements is spatially chirped (illustrated schematically in FIGS. 6A and 6B). A transmission grating 608 with such a spatially chirped diffractive element set (FIG. 6A) would focus an input optical signal 602 in the plane normal to the diffractive lines and provide wavelength dispersion in the same plane, with output beams 604a and 604b of differing wavelength directed in differing directions (FIG. 6B).

It is possible, with varying degrees of wavefront transformation fidelity, to approximate the diffractive elements computationally derived from simulated design input and output beams with simple conic section curves such as circular arcs, parabolic arcs, elliptical arcs, or hyperbolic arcs. Such approximation can serve to simplify numerical design algorithms at the cost of imperfect yet operationally acceptable wavefront transformation.

The presently disclosed methods for designing substantially optimized diffractive element sets by computed interference of simulated optical signals may be generalized to devices connecting one input port to multiple output ports, multiple input ports to one output port, or more complex combinations of one-or-more inputs to one-or-more outputs. Several methods may be used to design and fabricate such devices, which may include multiple diffractive element sets. Discussion of how multiple ports can be connected is given in references listed above.

It should be noted that interferograms derived by the previously described methods preserve phase relationships between the simulated design input and output optical fields. In devices combining two or more input fields into a single output field this may lead to a sensitivity of the power coupled in the output mode to the specific relative phase of the input fields. As phase relationships between physical input fields input to a fabricated device change or deviate from those between the simulated design input fields, the output powers and spatial configurations may change. Such an effect can be employed for phase discriminating sensing, for example, or for spectroscopic calibration against a reference optical signal.

Amplitude and/or phase apodization methods applicable to diffractive elements are discussed in various of the references listed above. Such methods can be employed to ensure that output beams have desired convergence, divergence, or collimation properties. Alternatively, tailoring the spatial profile of the input beam to fall entirely within the extent of the diffractive structure with spatial apodization can be employed to tailor the spatial properties of the output optical beam.

In the exemplary embodiments disclosed herein, specific dimensions and materials have been recited. It should be understood that use of such dimensions and materials is for illustrative purposes only and should not be construed as limiting the scope of the present disclosure or appended claims. Within the scope of the present disclosure or appended claims, a wide range of materials (including but not limited to metals, polymers, plastics, various glasses, and semi-conductor materials) may be employed for forming a transmission grating or its diffractive elements. It should also be understood that the structure of diffractive elements in the exemplary embodiments is for illustrative purposes only, and that sets of diffractive elements of various topologies using any appropriate fabrication processes shall fall within the scope of the present disclosure or appended claims. Suitable fabrication processes for forming a diffractive element sets can include, but are not limited to, electroplating, stamping, ion exchange, lithographic scribing, photolithography (including projection photolithography), injection molding, embossing, spin-coating, roll-pressing, UV-curing, laser or proton beam direct writing, or stamping. Projection lithography with a suitable scale factor change from mask to substrate (reduction, magnification, or unity) provides useful access to patterning tools with spatial resolution insufficient to directly render diffractive element sets on the transmission grating.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements may be reduced in some Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. For purposes of the present disclosure and appended claims, terms such as "comprising", "having", "including", and variants thereof are intended as open-ended terminology, and should be construed as if the phrase "at least one" appears after each instance thereof. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. A method, comprising:
   computing in a transmission grating region an interference pattern between a simulated design input optical signal and a simulated design output optical signal, the input and output optical signals each propagating through the transmission grating region as substantially unconfined optical beams;
   computationally deriving an arrangement for at least one diffractive element set from the computed interference pattern, so that when the diffractive element set thus arranged is formed in or on a transmission grating, each diffractive element set would route, between corresponding input and output optical ports, a corresponding diffracted portion of an input optical signal incident on and transmitted by the transmission grating; and
   forming the set of diffractive elements in or on the transmission grating according to the arrangement derived therefor,
   wherein diffractive elements of the set comprise a set of spaced-apart non-transmissive filaments.

2. The method of claim 1, wherein the diffractive element set is arranged so as to exhibit a wavelength dependent propagation direction of the output optical signal.

3. The method of claim 1, wherein the diffractive elements exhibit a spatially varying spacing between adjacent elements.

4. The method of claim 1, wherein the diffractive elements exhibit a spatially varying diffractive amplitude distribution.

5. The method of claim 1, wherein the diffractive elements are formed by electroplating, stamping, ion exchange, lithographic scribing, photolithography, projection photolithography, reduction photolithography, injection molding, embossing, spin-coating, injection molding, roll-pressing, UV-curing, contact printing, or laser or proton beam direct writing.

6. The method of claim 1, further comprising replicating the diffractive element set by stamping, embossing, pressing, injection molding, or roll pressing.

7. The method of claim 1, wherein the arrangement of the diffractive elements of the set is computationally derived at least in part from a phase function of an interferogram of the interference pattern.

8. The method of claim 7, wherein the arrangement of the diffractive elements of the set is derived from a spatially-invariant diffractive amplitude spatial distribution.

9. The method of claim 7, wherein each element of the diffractive element set is defined with respect to a constant-phase-difference contour of the phase function of the interferogram.

10. The method of claim 7, wherein the arrangement of the diffractive elements of the set is derived from a spatially-varying diffractive amplitude spatial distribution.

11. The method of claim 10, wherein the intensity of the spatially-varying diffractive amplitude spatial distribution is proportional to a magnitude of the simulated design input optical signal, to a magnitude of the simulated design output optical signal, or to a product of the magnitudes of the design input and output optical signals.

12. The method of claim 10, wherein the spatially-varying diffractive amplitude spatial distribution is chosen to yield a desired spatial transformation upon routing the diffracted portion of the input optical signal between the input optical port and the output optical port.

13. The method of claim 10, wherein the spatially-varying diffractive amplitude spatial distribution is chosen to yield a desired spectral or temporal transformation upon routing the diffracted portion of the input optical signal between the input optical port and the output optical port.

14. The method of claim 1, wherein each of the simulated design input and output optical signals comprises a continuous-wave optical signal.

15. The method of claim 1, wherein the simulated design input optical signal comprises a substantially transform-limited optical pulse, and the simulated design output optical signal comprises a Fourier transform of a desired spectral transfer function.

16. A method, comprising:
   computing in a transmission grating region an interference pattern between a simulated design input optical signal and a simulated design output optical signal, the input and output optical signals each propagating through the transmission grating region as substantially unconfined optical beams;
   computationally deriving an arrangement for at least one diffractive element set from the computed interference pattern, so that when the diffractive element set thus arranged is formed in or on a transmission grating, each diffractive element set would route, between corresponding input and output optical ports, a corresponding diffracted portion of an input optical signal incident on and transmitted by the transmission grating; and
   forming the set of diffractive elements in or on the transmission grating according to the arrangement derived therefor,
   wherein the transmission grating is substantially flat, and the diffractive element set is arranged so that the respective wavefronts of the input and output optical signals exhibit differing convergence, divergence, or collimation properties.

17. The method of claim 16, wherein the diffractive element set comprises a surface relief structure.

18. The method of claim 16, wherein diffractive elements of the set each comprise a binary refractive index modulation.

19. The method of claim 16, wherein diffractive elements of the set each comprise more than two levels of refractive index modulation.

20. The method of claim 16, wherein the diffractive element set is arranged so as to exhibit a wavelength dependent propagation direction of the output optical signal.

21. The method of claim 16, wherein the diffractive elements exhibit a spatially varying spacing between adjacent elements.

22. The method of claim 16, wherein the diffractive elements exhibit a spatially varying diffractive amplitude distribution.

23. The method of claim 16, wherein the diffractive elements are formed by electroplating, stamping, ion exchange, lithographic scribing, photolithography, projection photolithography, reduction photolithography, injection molding, embossing, spin-coating, roll-pressing, UV-curing, contact printing, or laser or proton beam direct writing.

24. The method of claim 16, further comprising replicating the diffractive element set by stamping, embossing, pressing, injection molding, or roll pressing.

25. The method of claim 16, wherein the arrangement of the diffractive elements of the set is computationally derived at least in part from a phase function of an interferogram of the interference pattern.

26. The method of claim 25, wherein the arrangement of the diffractive elements of the set is derived from a spatially-invariant diffractive amplitude spatial distribution.

27. The method of claim 25, wherein each element of the diffractive element set is defined with respect to a constant-phase-difference contour of the phase function of the interferogram.

28. The method of claim 25, wherein the arrangement of the diffractive elements of the set is derived from a spatially-varying diffractive amplitude spatial distribution.

29. The method of claim 28, wherein the intensity of the spatially-varying diffractive amplitude spatial distribution is proportional to a magnitude of the simulated design input optical signal, to a magnitude of the simulated design output optical signal, or to a product of the magnitudes of the design input and output optical signals.

30. The method of claim 28, wherein the spatially-varying diffractive amplitude spatial distribution is chosen to yield a desired spatial transformation upon routing the diffracted portion of the input optical signal between the input optical port and the output optical port.

31. The method of claim 28, wherein the spatially-varying diffractive amplitude spatial distribution is chosen to yield a desired spectral or temporal transformation upon routing the diffracted portion of the input optical signal between the input optical port and the output optical port.

32. The method of claim 16, wherein each of the simulated design input and output optical signals comprises a continuous-wave optical signal.

33. The method of claim 16, wherein the simulated design input optical signal comprises a substantially transform-limited optical pulse, and the simulated design output optical signal comprises a Fourier transform of a desired spectral transfer function.

34. A method, comprising:
  computing in a transmission grating region an interference pattern between a simulated design input optical signal and a simulated design output optical signal, the input and output optical signals each propagating through the transmission grating region as substantially unconfined optical beams;
  computationally deriving an arrangement for at least one diffractive element set from the computed interference pattern, so that when the diffractive element set thus arranged is formed in or on a transmission grating, each diffractive element set would route, between corresponding input and output optical ports, a corresponding diffracted portion of an input optical signal incident on and transmitted by the transmission grating; and
  forming the set of diffractive elements in or on the transmission grating according to the arrangement derived therefor,
  wherein the diffractive elements are formed by projection photolithography with a mask having a mask size scale that is larger than a corresponding diffractive element size scale.

35. The method of claim 34, wherein the diffractive element set comprises a surface relief structure.

36. The method of claim 34, wherein diffractive elements of the set each comprise a binary refractive index modulation.

37. The method of claim 34, wherein diffractive elements of the set each comprise more than two levels of refractive index modulation.

38. The method of claim 34, wherein the diffractive element set is arranged so as to exhibit a wavelength dependent propagation direction of the output optical signal.

39. The method of claim 34, wherein the diffractive elements exhibit a spatially varying spacing between adjacent elements.

40. The method of claim 34, wherein the diffractive elements exhibit a spatially varying diffractive amplitude distribution.

41. The method of claim 34, further comprising replicating the diffractive element set by stamping, embossing, pressing, injection molding, or roll pressing.

42. The method of claim 34, wherein the arrangement of the diffractive elements of the set is computationally derived at least in part from a phase function of an interferogram of the interference pattern.

43. The method of claim 42, wherein the arrangement of the diffractive elements of the set is derived from a spatially-invariant diffractive amplitude spatial distribution.

44. The method of claim 42, wherein each element of the diffractive element set is defined with respect to a constant-phase-difference contour of the phase function of the interferogram.

45. The method of claim 42, wherein the arrangement of the diffractive elements of the set is derived from a spatially-varying diffractive amplitude spatial distribution.

46. The method of claim 45, wherein the intensity of the spatially-varying diffractive amplitude spatial distribution is proportional to a magnitude of the simulated design input optical signal, to a magnitude of the simulated design output optical signal, or to a product of the magnitudes of the design input and output optical signals.

47. The method of claim 45, wherein the spatially-varying diffractive amplitude spatial distribution is chosen to yield a desired spatial transformation upon routing the diffracted portion of the input optical signal between the input optical port and the output optical port.

48. The method of claim 45, wherein the spatially-varying diffractive amplitude spatial distribution is chosen to yield a desired spectral or temporal transformation upon routing the diffracted portion of the input optical signal between the input optical port and the output optical port.

49. A method, comprising:
  computing in a transmission grating region an interference pattern between a simulated design input optical signal and a simulated design output optical signal, the input and output optical signals each propagating through the transmission grating region as substantially unconfined optical beams;
  computationally deriving an arrangement for at least one diffractive element set from the computed interference pattern, so that when the diffractive element set thus arranged is formed in or on a transmission grating, each diffractive element set would route, between corresponding input and output optical ports, a corresponding diffracted portion of an input optical signal incident on and transmitted by the transmission grating;
  computing in a transmission grating region an interference pattern between the simulated design input optical signal and a second simulated design output optical signal or between a second simulated design input optical signal and the simulated design output optical signal, the input and output optical signals each propagating through the transmission grating region as substantially unconfined optical beams;
  computationally deriving an arrangement of diffractive elements for a second diffractive element set, so that when the second diffractive element set is formed in or on the transmission grating, a second diffracted portion of the input optical signal would be routed between the input optical port and a second output optical port, or a diffracted portion of a second input optical signal would be routed between a second input optical port and the output optical port; and forming the first and second sets of diffractive elements in or on the transmission grating according to the corresponding arrangements derived therefor, wherein the corresponding contours of the first and second diffractive element sets are spatially coherent so as to result in a designed phase relationship among the first and second input optical signal and the output optical signal or among the input optical signal and the first and second output optical signals.

50. The method of claim 34, wherein each of the simulated design input and output optical signals comprises a continuous-wave optical signal.

51. The method of claim 34, wherein the simulated design input optical signal comprises a substantially transform-limited optical pulse, and the simulated design output optical signal comprises a Fourier transform of a desired spectral transfer function.

52. The method of claim 49, wherein each of the first and second diffractive element sets comprises a surface relief structure.

53. The method of claim 49, wherein diffractive elements of the set each comprise a binary refractive index modulation.

54. The method of claim 49, wherein diffractive elements of the first and second sets each comprise more than two levels of refractive index modulation.

55. The method of claim 49, wherein at least one of the diffractive element sets is arranged so as to exhibit a wavelength dependent propagation direction of the output optical signal.

56. The method of claim 49, wherein the diffractive elements of at least one of the sets exhibit a spatially varying spacing between adjacent elements.

57. The method of claim 49, wherein the diffractive elements of at least one of the sets exhibit a spatially varying diffractive amplitude distribution.

58. The method of claim 49, wherein the diffractive elements are formed by electroplating, stamping, ion exchange, lithographic scribing, photolithography, projection photolithography, reduction photolithography, injection molding, embossing, spin-coating, roll-pressing, UV-curing, contact printing, or laser or proton beam direct writing.

59. The method of claim 49, further comprising replicating the diffractive element set by stamping, embossing, pressing, injection molding, or roll pressing.

60. The method of claim 49, wherein the arrangement of the diffractive elements of each set is computationally derived at least in part from a phase function of an interferogram of the corresponding interference pattern.

61. The method of claim 60, wherein the arrangement of the diffractive elements of each set is derived from a corresponding spatially-invariant diffractive amplitude spatial distribution.

62. The method of claim 60, wherein each element of the diffractive element sets is defined with respect to a constant-phase-difference contour of the phase function of the corresponding interferogram.

63. The method of claim 60, wherein the arrangement of the diffractive elements of each set is derived from a corresponding spatially-varying diffractive amplitude spatial distribution.

64. The method of claim 63, wherein the intensity of the corresponding spatially-varying diffractive amplitude spatial distribution is proportional to a magnitude of the corresponding simulated design input optical signal, to a magnitude of the corresponding simulated design output optical signal, or to a product of the magnitudes of the corresponding design input and output optical signals.

65. The method of claim 63, wherein the corresponding spatially-varying diffractive amplitude spatial distribution is chosen to yield a desired spatial transformation upon routing the diffracted portion of the corresponding input optical signal between the corresponding input optical port and the corresponding output optical port.

66. The method of claim 63, wherein the corresponding spatially-varying diffractive amplitude spatial distribution is chosen to yield a desired spectral or temporal transformation upon routing the diffracted portion of the corresponding input optical signal between the corresponding input optical port and the corresponding output optical port.

67. The method of claim 49, wherein each of the simulated design input and output optical signals comprises a continuous-wave optical signal.

68. The method of claim 49, wherein the simulated design input optical signal comprises a substantially transform-limited optical pulse, and the corresponding simulated design output optical signal comprises a Fourier transform of a desired spectral transfer function.

* * * * *